United States Patent
Chou et al.

(10) Patent No.: US 10,673,682 B2
(45) Date of Patent: Jun. 2, 2020

(54) NETWORK RESOURCE MODEL TO SUPPORT NETWORK FUNCTION VIRTUALIZATION LIFECYCLE MANAGEMENT

(71) Applicant: Intel Corporation, Santa Clara, CA (US)

(72) Inventors: Joey Chou, Scottsdale, AZ (US); Stephen Gooch, Santa Clara, CA (US); Kapil Sood, Beaverton, OR (US); Brian J. Skerry, Gilbert, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 102 days.

(21) Appl. No.: 15/574,140

(22) PCT Filed: Dec. 21, 2015

(86) PCT No.: PCT/US2015/067126
§ 371 (c)(1),
(2) Date: Nov. 14, 2017

(87) PCT Pub. No.: WO2017/014803
PCT Pub. Date: Jan. 26, 2017

(65) Prior Publication Data
US 2018/0131557 A1 May 10, 2018

Related U.S. Application Data

(60) Provisional application No. 62/196,191, filed on Jul. 23, 2015.

(51) Int. Cl.
*H04L 12/24* (2006.01)
*G06F 9/455* (2018.01)
*H04L 5/00* (2006.01)

(52) U.S. Cl.
CPC ........ *H04L 41/044* (2013.01); *G06F 9/45558* (2013.01); *H04L 5/0055* (2013.01);
(Continued)

(58) Field of Classification Search
CPC .................................................. H04L 41/044
(Continued)

(56) References Cited

U.S. PATENT DOCUMENTS

2014/0115583 A1* 4/2014 Lee ...................... H04W 4/60
718/1
2014/0201374 A1 7/2014 Ashwood-Smith et al.
(Continued)

FOREIGN PATENT DOCUMENTS

BR 102018000241 A2 11/2018
CN 107852337 A 3/2018
(Continued)

OTHER PUBLICATIONS

Partial European Search Report for EP Application No. 15899111.7-1216, dated Dec. 13, 2018, 14 pages.
(Continued)

*Primary Examiner* — David R Lazaro
*Assistant Examiner* — Zia Khurshid
(74) *Attorney, Agent, or Firm* — Jaffery Watson Mendonsa & Hamilton LLP

(57) ABSTRACT

Apparatus, systems, and methods create, modify, and delete managed objects utilized by VNF lifecycle management automatically are disclosed and claimed. Other examples are also disclosed and claimed.

25 Claims, 13 Drawing Sheets

(52) U.S. Cl.
CPC .............. *H04L 41/08* (2013.01); *H04L 41/12* (2013.01); *G06F 2009/45562* (2013.01); *G06F 2009/45595* (2013.01); *Y04S 40/162* (2013.01)

(58) Field of Classification Search
USPC ........................................................ 709/220
See application file for complete search history.

(56) References Cited

U.S. PATENT DOCUMENTS

| | | | |
|---|---|---|---|
| 2014/0317261 A1 | 10/2014 | Shatzkamer et al. | |
| 2015/0082308 A1 | 3/2015 | Kiess et al. | |
| 2015/0180730 A1 | 6/2015 | Felstaine et al. | |
| 2016/0353226 A1* | 12/2016 | Rao | H04L 41/0654 |

FOREIGN PATENT DOCUMENTS

| | | |
|---|---|---|
| EP | 3326324 | 5/2018 |
| JP | 2018530183 A | 10/2018 |
| KR | 10-2015-0000420 A | 1/2015 |
| WO | 2017/014803 A1 | 1/2017 |

OTHER PUBLICATIONS

"Network Functions Virtualisation (NFV); Management and Orchestration", Group Specification, European Telecommunications Standards Institute (ETSI), 650, Route Des Lucioles ; F-06921 Sophia-Antipolis ; France, vol. NFV MAN, No. VI.1.1,, Dec. 1, 2014 (Dec. 1, 2014), XP014235740.
"HP: IFA013 VNF Package State model annex; NFVIFA(15)000772 IFA013_VNF_Package_State_model_annex" , ETSI Draft; NFVIFA(15)000772_IFA013_VNF_Package State Model Annex, European Telecommunications—Standards Institute (ETSI), 650, Route Des Lucioles ; F-06921 Sophia-Antipolis ; France, vol. ISG—NFV, Jun. 5, 2015 (Jun. 5, 2015), pp. 1-3, XP014260980.
Network Functions Virtualisation (NFV); Architectural Framework;ETSI GS NFV 00211 , ETSI Draft; ETSI GS NFV 002, European Telecommunications Standards Institute (ETSI), 650, Route Des Lucioles ; F-06921 Sophia-Antipolis ; France, vol. ISG—NFV, No. V.1.2, Nov. 2, 2014 (Nov. 24, 2014), pp. 1-21, XP014222451.
International Preliminary Report on Patentability received for International Application No. PCT/US2015/067126, dated Feb. 1, 2018, 8 pages.
Extended European Search Report for EP Application No. 15899111.7-1216, dated Mar. 20, 2019, 11 pages.
Notification of Publication of the Request to Record for Hong Kong Application No. 18111319.1 Publication No. 1251991 A, published May 10, 2019, 2 pages.
International Search Report and Written Opinion received for International Application No. PCT/US2015/067126, dated May 30, 2016, 12 pages.
"3rd Generation Partnership Project; Technical Specification Group Services and System Aspects; Telecommunication management; Study on network management of virtualized networks (Release 13)",3GPP Draft; 32842-120, 3rd Generation Partnership Project (3GPP), Mobile Competence Centre ; 650, Route Des Lucioles ; F-06921 Sophia-Antipolis Cedex ; France, Jul. 6, 2015 (Jul. 6, 2015), XP050986292,Retrieved from the Internet:URL:http://www.3gpp.org/ftp/tsg_sa/WG5_ TM/TSGS5_ 101 /Docs/.
Communication Pursuant to Article 94(3) EPC for EP Application No. 15899111.7, dated Feb. 17, 2020, 7 pages.

* cited by examiner

NETWORK RESOURCE MODEL TO SUPPORT NETWORK FUNCTION VIRTUALIZATION LIFECYCLE MANAGEMENT

RELATED APPLICATIONS

This application claims the benefit of priority under 35 U.S.C. § 371 to International Application No. PCT/US2015/067126 filed Dec. 21, 2015, entitled NETWORK RESOURCE MODEL TO SUPPORT NETWORK FUNCTION VIRTUALIZATION LIFECYCLE MANAGEMENT which in turn claims benefit of priority under 35 U.S.C. § 119(e) of U.S. Provisional Application Ser. No. 62/196,191, filed Jul. 23, 2015, entitled METHOD AND SYSTEM OF NETWORK RESOURCE MODEL TO SUPPORT NFV LIFE CYCLE MANAGEMENT, the disclosure of which is incorporated herein by reference in its entirety.

FIELD

The present disclosure generally relates to the field of electronic communication. More particularly, aspects generally relate to a network resource model to support network function virtualization in communication systems.

BACKGROUND

When a public land mobile network (PLMN) is installed and initialized for the first time, the various objects representing network entities (NEs) are created, and are introduced to the network manager (NM). The NM enables operators to manage the PLMN networks that are essential to its operations. Since the installation of traditional or non-virtualized PLMN networks is done manually, managed objects are created manually.

This is not the case for network function virtualization (NFV). In virtualized networks, virtual network function (VNF) instances are instantiated or terminated automatically according to various VNF lifecycle management procedures. Thus, the various managed objects may be created or deleted automatically. Accordingly, techniques to create, modify, and delete managed objects utilized by VNF lifecycle management automatically may find utility, e.g., in virtualized networking environments.

BRIEF DESCRIPTION OF THE DRAWINGS

The detailed description is provided with reference to the accompanying figures. The use of the same reference numbers in different figures indicates similar or identical items.

Figure 1:
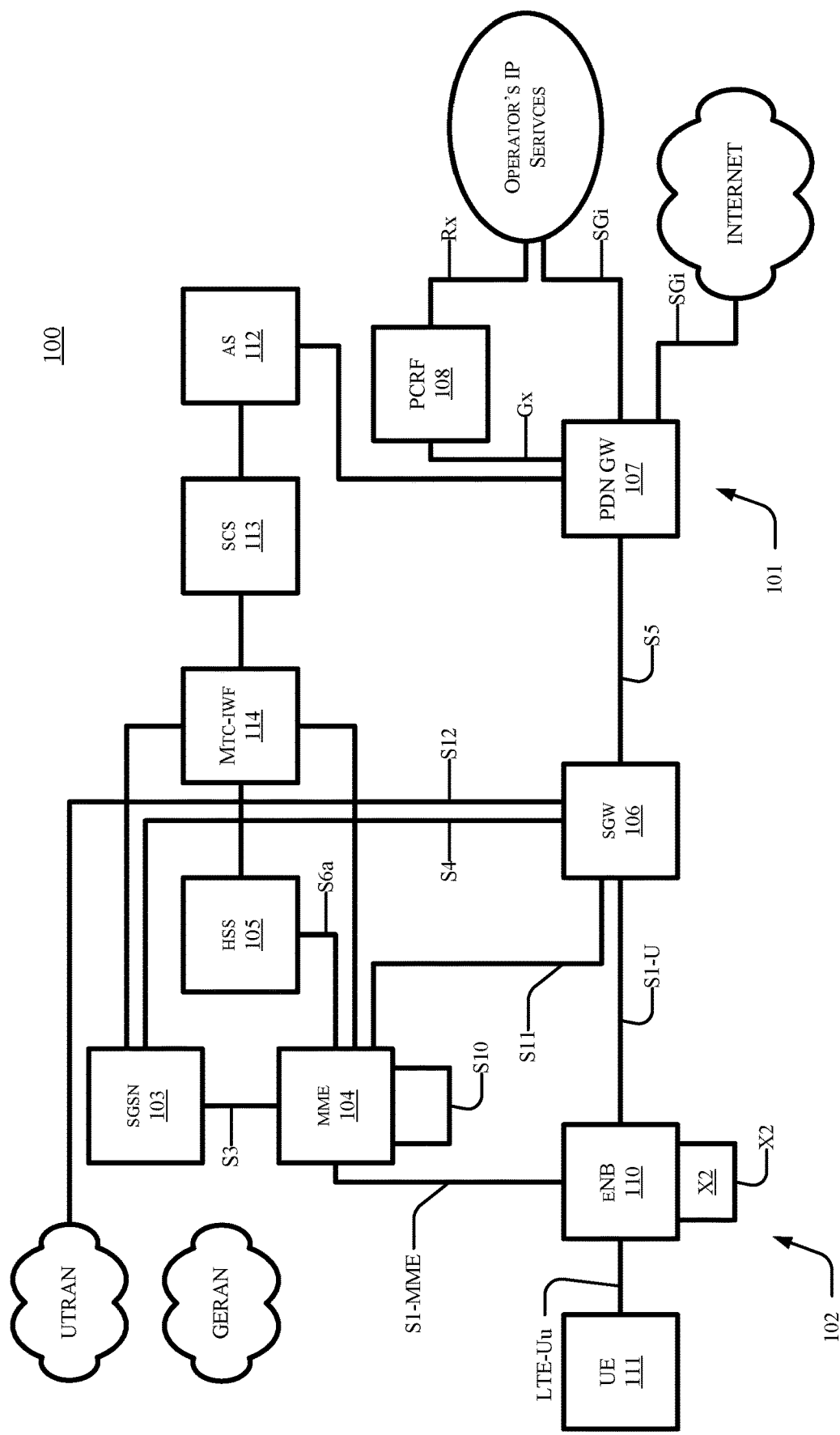
FIG. 1 is a schematic, block diagram illustration of components in a 3GPP LTE network in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

As described in brief above, techniques to create, modify, and delete managed objects utilized by VNF lifecycle management automatically may find utility, e.g., in virtualized networking environments. Features and characteristics of such techniques and communication systems in which the techniques may be incorporated are described below with reference to FIGS. 1-13.

FIG. 1 shows an exemplary block diagram of the overall architecture of a 3GPP LTE network 100 that may include one or virtual network functions, according to the subject matter disclosed herein. FIG. 1 also generally shows exemplary network elements and exemplary standardized interfaces. At a high level, network 100 comprises a core network (CN) 101 (also referred to as an EPC), and an air-interface access network E UTRAN 102. CN 101 is responsible for the overall control of the various User Equipment (UE) connected to the network and establishment of the bearers. CN 101 may include functional entities, such as a home agent and/or an ANDSF server or entity, although not explicitly depicted. E UTRAN 102 is responsible for all radio-related functions.

The main exemplary logical nodes of CN 101 include, but are not limited to, a Serving GPRS Support Node 103, the Mobility Management Entity 104, a Home Subscriber Server (HSS) 105, a Serving Gate (SGW) 106, a PDN Gateway 107 and a Policy and Charging Rules Function (PCRF) Manager 108. The functionality of each of the network elements of CN 101 is well known and is not described herein. Each of the network elements of CN 101 are interconnected by well-known exemplary standardized interfaces, some of which are indicated in FIG. 1A, such as interfaces S3, S4, S5, etc., although not described herein.

While CN 101 includes many logical nodes, the E UTRAN access network 102 is formed by at least one node, such as evolved NodeB (base station (BS), eNB or eNodeB) 110, which connects to one or more User Equipment (UE) 111, of which only one is depicted in FIG. 1A. UE 111 is also referred to herein as a wireless device (WD) and/or a subscriber station (SS), and can include an M2M-type device. In one example, UE 111 may be coupled to eNB by an LTE-Uu interface. In one exemplary configuration, a single cell of an E UTRAN access network 102 provides one substantially localized geographical transmission point (having multiple antenna devices) that provides access to one or more UEs. In another exemplary configuration, a single cell of an E UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 104 by an S1 MME interface and to SGW 106 by an S1 U interface. The protocols that run between the eNBs and the UEs are generally referred to as the "AS protocols." Details of the various interfaces are well known and not described herein.

The eNB 110 hosts the PHYsical (PHY), Medium Access Control (MAC), Radio Link Control (RLC), and Packet Data Control Protocol (PDCP) layers, which are not shown in FIG. 1A, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

Figure 2A:
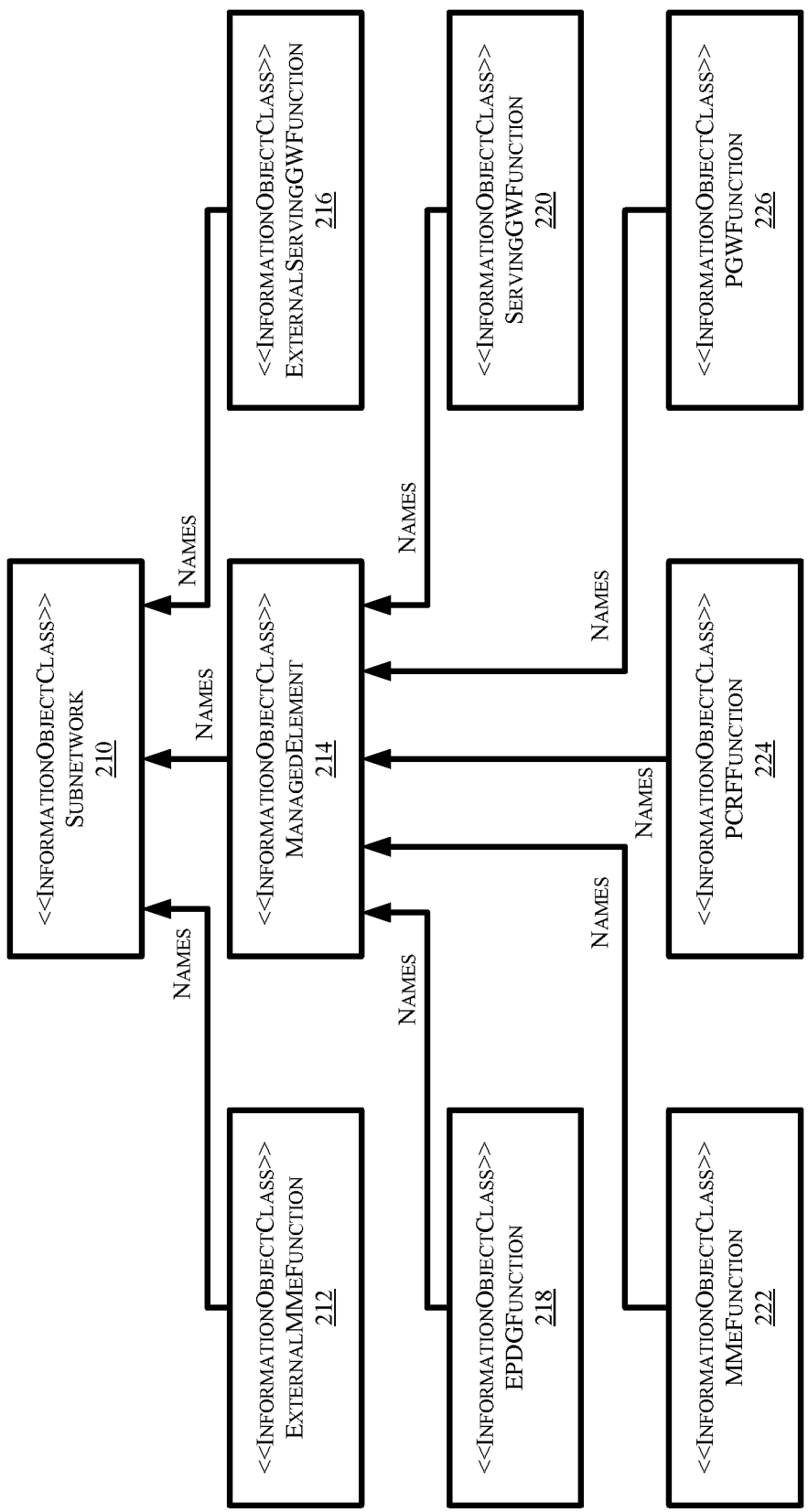
FIG. 2A is a schematic, block diagram illustration of Evolved Core Packet (ECP) Network Resource Model (NRM) containment/naming relationships in accordance with various examples discussed herein.

FIG. 2 is a schematic, block diagram illustration of Evolved Core Packet (ECP) Network Resource Model (NRM) containment/naming relationships in accordance with various examples discussed herein. Referring to FIG. 2, the NRM subnetwork comprises a ManagedElement object 214 that corresponds to a 3GPP Network Element (NE), and may contain an evolved packet data gateway (EDPG) Function 218, a ServingGwFunction 220, a MMEFunction 222, a ManagedPCRFunction 224, and a PGWFunction 226 that represent MME, PCRF, Serving Gateway, and PDN Gateway. When a PLMN network is installed the first time, it will create ManagedElement, MMEFunction, PCRFunction, ServingGwFunction, and PGWFunction manually.

In NFV, the VNF packages can be on-boarded or deleted automatically and VNF instances can be instantiated or terminated automatically. Therefore, the managed objects may to be created, deleted, or modified automatically. Table 1 provides a list of attributes of ManagedElement.

TABLE I

| Attribute Name | Support Qualifier | isReadable | isWritable | isInvariant | isNotifyable |
| --- | --- | --- | --- | --- | --- |
| vendorName | M | M | — | — | M |
| userDefinedState | M | M | M | — | M |

TABLE I-continued

| Attribute Name | Support Qualifier | isReadable | isWritable | isInvariant | isNotifyable |
|---|---|---|---|---|---|
| swVersion | M | M | — | — | M |
| managedElementType | M | M | M | | M |
| vnfImageId | CM | M | M | | M |

In Table I, VendorName represents the name of the vendor creating the VNF, userDefinedState represents the state of the VNF package (e.g. disabled, enabled, etc.), swVersion represents the version of the software, managedElementType represents the type of VNF (e.g. vMME, vSGW, vPGW, etc.), vnfImageId represents the ID of the VNF image, which is added to support NFV, and is only applicable to virtualized networks.

Figure 2B:
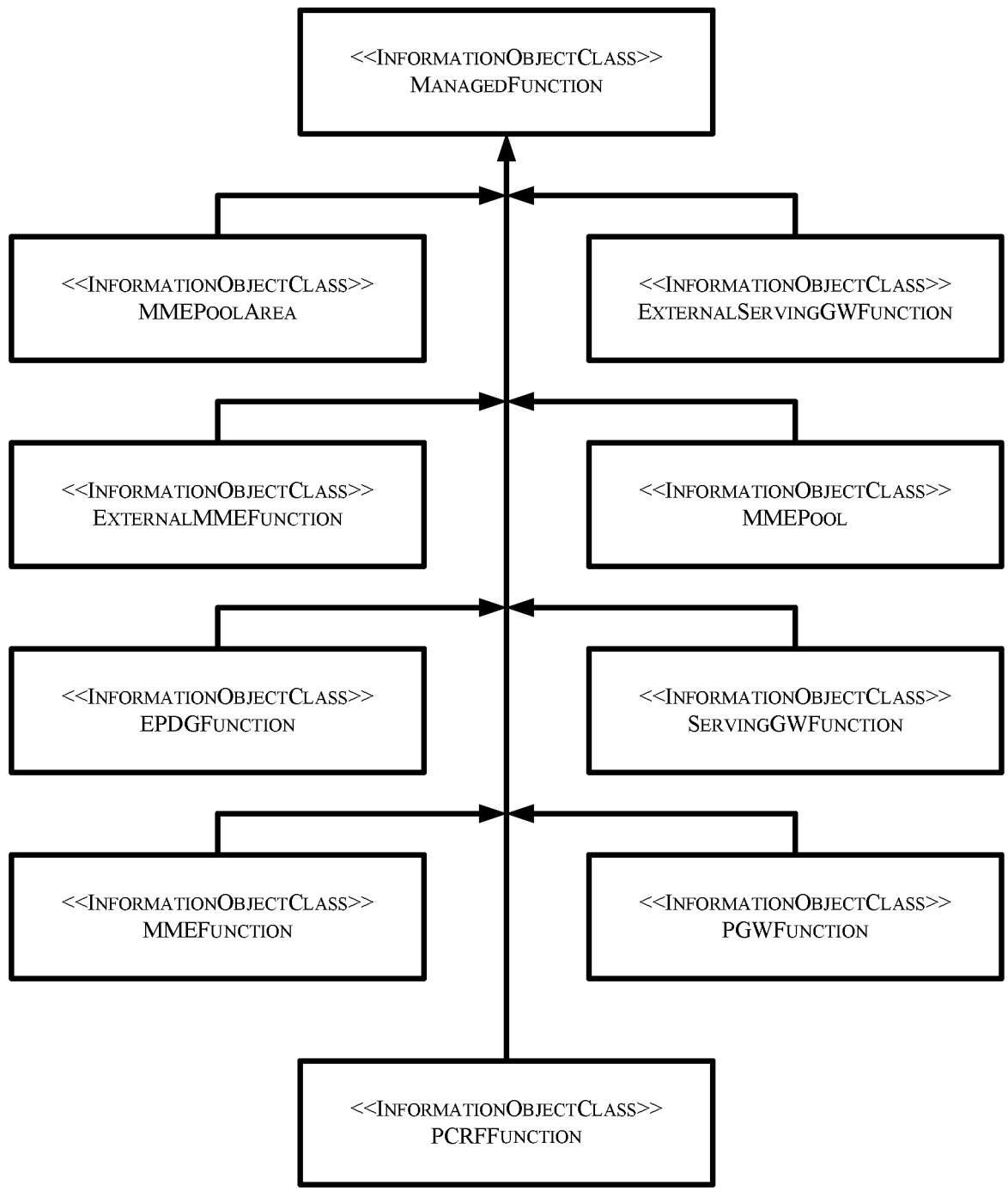
FIG. 2B is a schematic, block diagram illustration of ECP Network Resource Model (NRM) in accordance with various examples discussed herein.

FIG. 2B is a schematic, block diagram illustration of Evolved Core Packet (ECP) Network Resource Model (NRM) in accordance with various examples discussed herein. More particularly, FIG. 2B illustrates the EPC NRM inheritance hierarchy, which may be used to support NFV. Since MMEFunction, PCRFunction, ServingGwFunction, and PGWFunction are inherited from ManagedFunction, ManagedFunction should contain the attributes that are common to all VNF applications. Table II lists the attributes of ManagedFunction.

TABLE II

| Attribute Name | Support Qualifier | isReadable | isWritable | isInvariant | isNotifyable |
|---|---|---|---|---|---|
| vnfInstanceId | CM | M | M | — | M |

The parameter vnfInstanceId represents the ID of the VNF instance. It is added to support NFV, and is only applicable to virtualized networks.

VNF Package on-boarding and VNF instantiation, scaling, and termination are key functions of VNF lifecycle management. VNF Package on-boarding is closely related to the operation of VNF instantiation, scaling, and termination. For example, a VNF cannot be instantiated until the VNF package is on-boarded, and enabled. Moreover, a VNF package can be deleted only if such VNF package is disabled and is not in use by any outstanding VNF instance(s). Finally, a VNF package can be updated if it is enabled or disabled and is not in use by any outstanding VNF instance(s).

Figure 3:
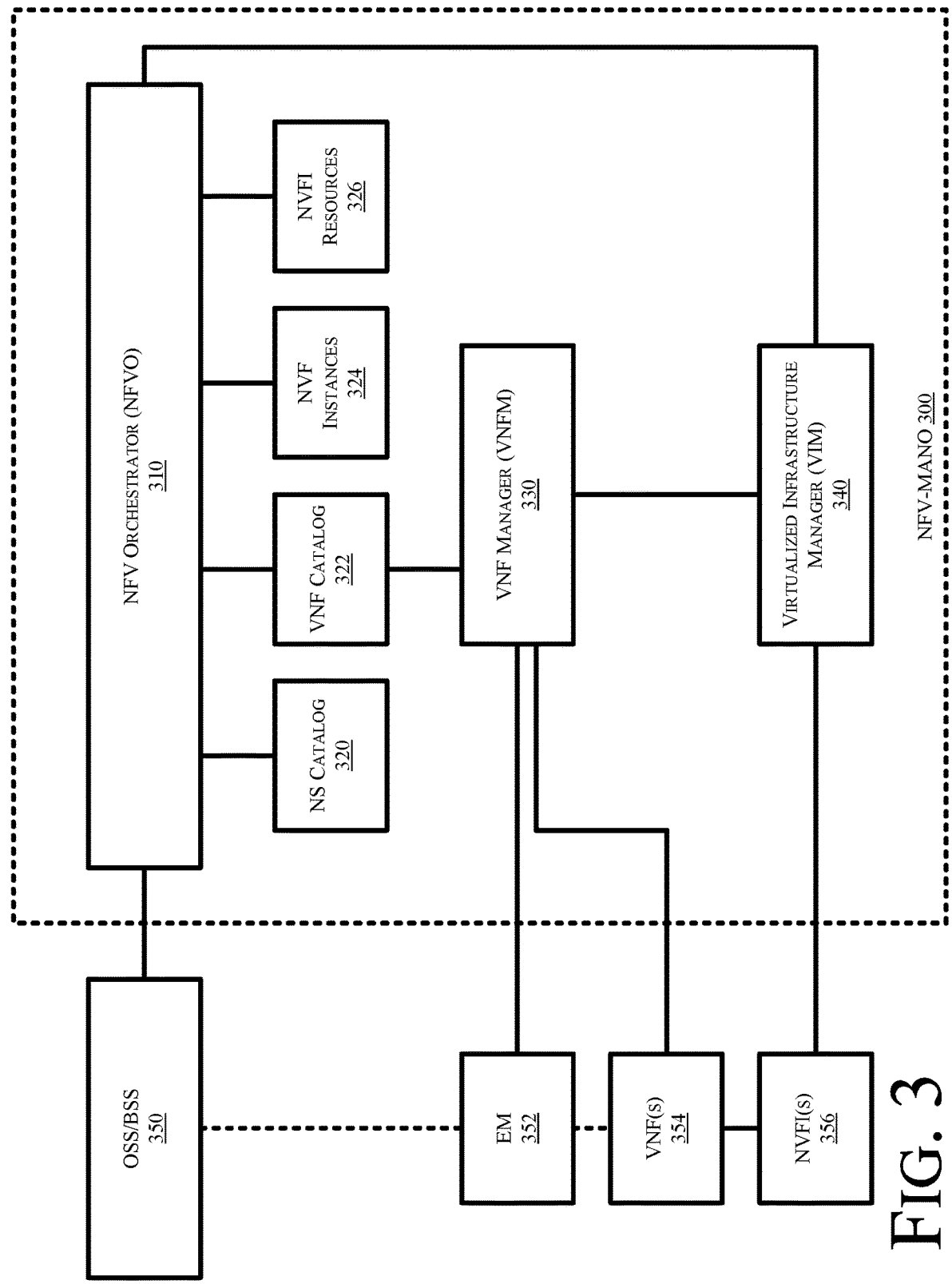
FIG. 3 is a schematic, block diagram illustration of an architecture for a network function virtualization management and orchestration (NFV-MANO) in accordance with various examples discussed herein.

FIG. 3 is a schematic, block diagram illustration of an architecture for a network function virtualization management and orchestration (NFV-MANO) in accordance with various examples discussed herein. Referring to FIG. 3, in one example a NFV-MANO 300 comprises a NFV Orchestrator 310 which maintains data repositories including a network service (NS) catalog 320, a virtualized network function (VNF) catalog, one or more network function virtualization (NFV) instances 324, and one or more network function virtualization infrastructure NFVI resources 326. NFV-MANO further comprises a VNF manager 330 and a virtualized infrastructure manager (VIM) 340.

NVF-MANO 300 may be communicatively coupled to an operations support system (OSS) and/or a business support system (BSS) 350, which is, in turn, communicatively coupled to an element manager 352, one or more virtualized network functions (VNF) 354 and one or more network virtualization function infrastructure (NVFI) components 356.

Figure 4:
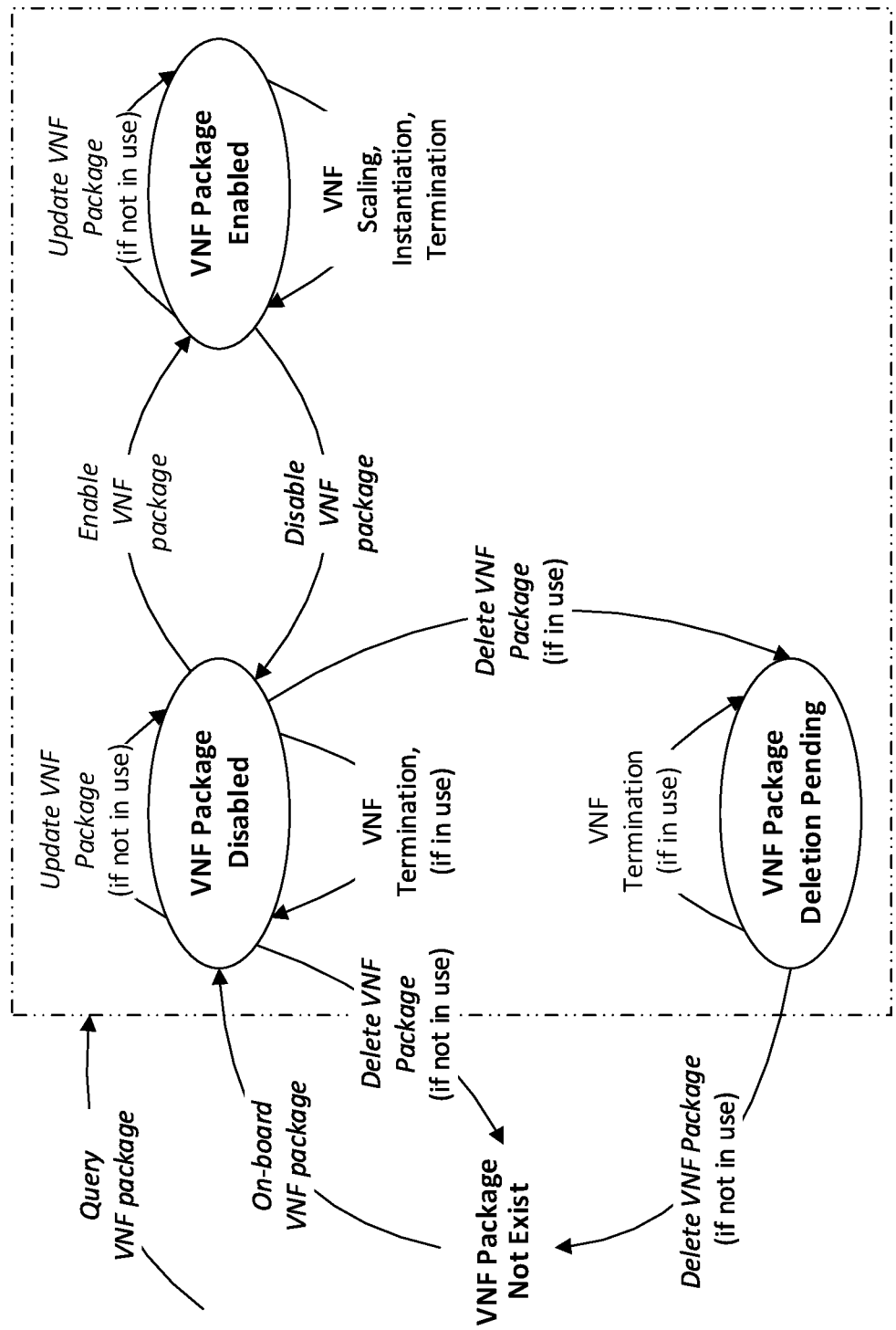
FIG. 4 is a Virtual Network Function (VNF) lifecycle management state transition diagram in accordance with various examples discussed herein.

The NFVO 310 is responsible for lifecycle management of network services, among other things. In that regard, FIG. 4 is a Virtual Network Function (VNF) lifecycle management state transition diagram in accordance with various examples discussed herein. FIG. 4 illustrates the flow of VNF lifecycle management operations. Referring to FIG. 4, a VNF on-board Package call is used to notify the Catalog about the creation of a VNF package, and to enable the virtualization infrastructure manager (VIM) to upload one or more VNF software image(s) to the network functions virtualization infrastructure (NFVI) then transition to a VNF Package Disabled state.

In the VNF Package Disabled state no VNF instantiation is allowed. A query VNF Package call is used to return from the Catalog the information of the VNF Packages. An enable VNF Package call enables the transition to a VNF Package Enabled state. If no VNF package is used by any VNF instance, then a VNF Delete Package call is used to notify the Catalog about the deletion of VNF package, and enable VIM to delete the VNF software image(s). A VNF Update Package call is used to update the VNF package. If a VNF package is used by any VNF instance, then a VNF Delete Package call enables the transition to a VNF Package Deletion Pending state, pending on the termination of outstanding VNF instance. A VNF termination call is used to terminate the remaining VNF instance. VNF scaling may or may not be allowed. A VNF Update Package call is used to generate a new VNF package.

In the VNF Package Enabled state a querying VNF Packages call is used to return from the Catalog the information of the VNF Packages. A Disable VNF Packages enables the transition to to VNF Package Disabled state. VNF scaling, instantiation, and termination are allowed. A VNF Update Package call is used to update the VNF package if the VNF package is not used by any VNF instance. Otherwise, a new VNF package will be generated.

In the VNF Package Deletion Pending state a Querying VNF Packages call is used to return from the Catalog the information of the VNF Packages. A VNF termination call is used to terminate the outstanding VNF instance(s). When there is no more outstanding VNF instance it will notify the Catalog about the deletion of VNF package and enable VIM to delete the VNF software image(s).

Figure 5:
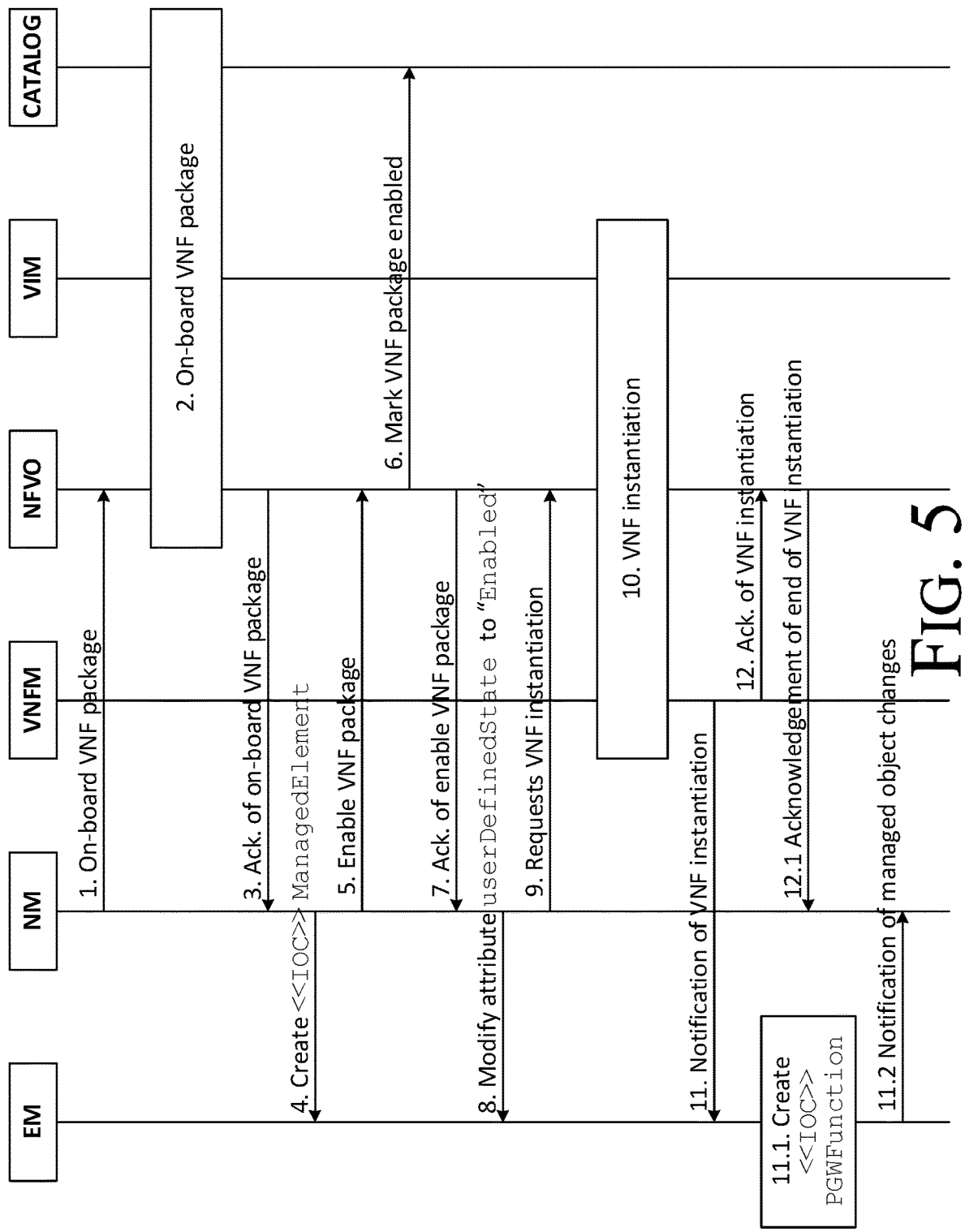
FIG. 5 is a diagram illustrating operations in configuration management with VNF instantiation procedures in accordance with various examples discussed herein.

FIG. 5 is a diagram illustrating operations in configuration management with VNF instantiation procedures in accordance with various examples discussed herein. FIG. 5 illustrates call flows in the procedures of configuration management functions including Create a Managed Object instance and Modify the attributes of a Managed Object instance(s) involved during the VNF instantiation.

Referring to FIG. 5, initially a network manager (NM) sends an On-board VNF package call to the network function virtualization orchestrator (NFVO). The NFVO executes an "On-board VNF package" flow to enable VIM to upload the VNF software images(s) to NFVI.

When the VNF package is on-boarded, the NFVO sends an acknowledgement of On-board VNF package to the NM. In response, the NM requests the element manager (EM) to create an <<IOC>> ManagedElement, modify the attribute userDefinedState to "Disabled" State, modify the attribute managedElementType to represent the type of VNF application, and modify VNF image ID=the ID of VNF image. The flowing uses Packet Gateway (PGW) as an example for the VNF application. Therefore, managedElementType is set to PGW.

The NM sends Enable VNF package call to the NFVO, which executes an "Enable VNF package" flow to enable the VNF package. When the VNF package is on-boarded, the NFVO sends acknowledgement of Enable VNF package to NM. In response, the NM requests EM to set the attribute userDefinedState to "Enabled" State.

The NM then requests the NFVO to instantiate a VNF instance. In response, the NFVO instantiates the VNF instance by requesting the VIM to create and start the VM(s) (including VNFs, and VNFCs) and relevant networking resources.

The VNFM sends a notification of successful VNF instantiation to EM. In response, the EM creates an <<IOC>> PGWFunction that is name-contained under ManagedElement, and modifies its attributes and notifies the NM about the changes of managed objects.

The VNFM sends an acknowledgment of successful VNF instantiation to NFVO. In response, the NFVO acknowledges the completion of the VNF instantiation to the NM.

Figure 6:
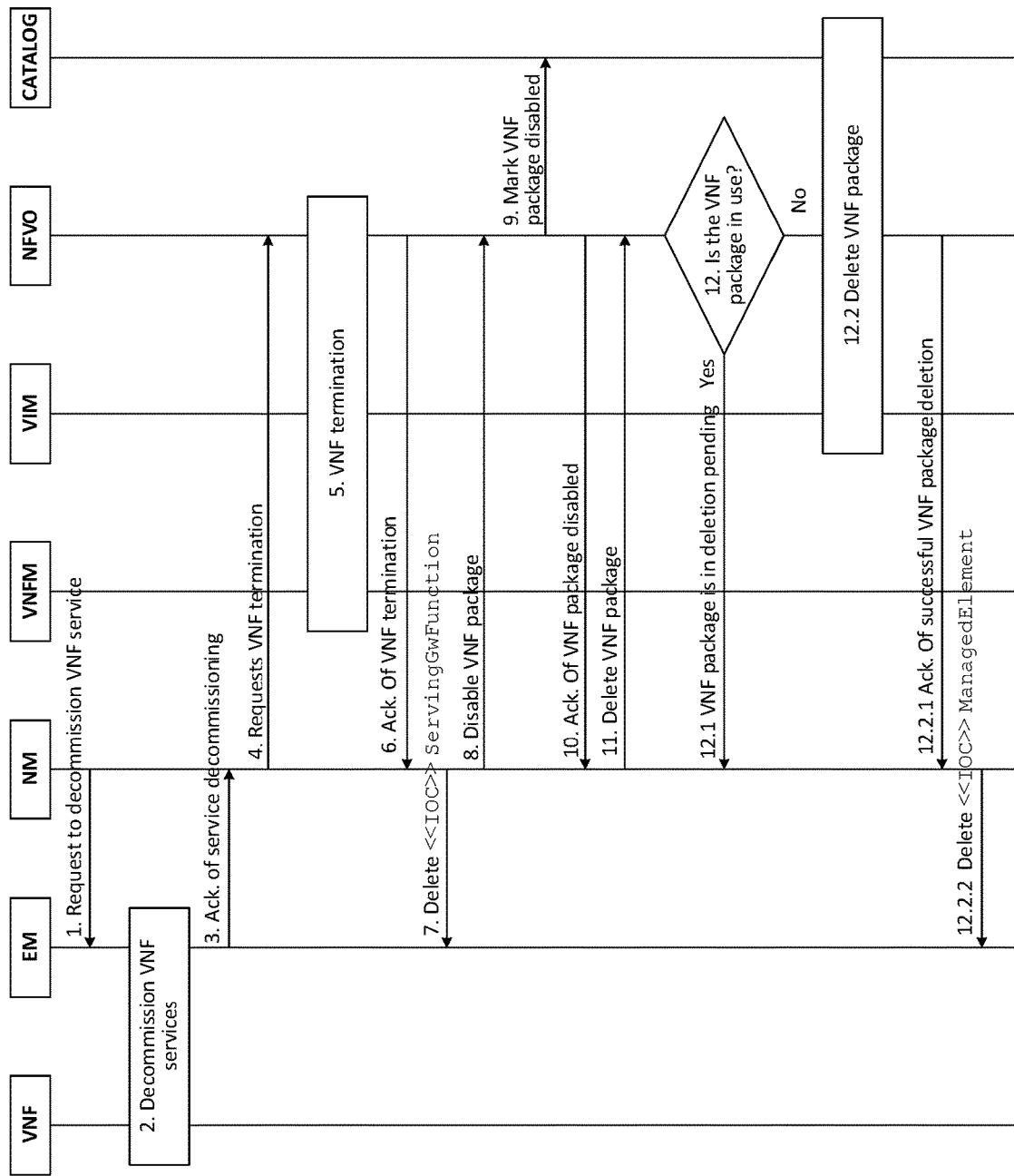
FIG. 6 is a diagram illustrating operations in configuration management with VNF instantiation procedures in accordance with various examples discussed herein.

FIG. 6 is a diagram illustrating operations in configuration management with VNF instantiation procedures in accordance with various examples discussed herein. FIG. 6 illustrates operation in configuration management functions including Modify the attributes of a Managed Object instance(s) involved during the VNF termination.

Referring to FIG. 6, the NM requests EM to decommission VNF services that are provided on the VNF to be terminated. In response, the EM decommissions VNF services (if VNF is providing services) and acknowledges the decommissioning of VNF services.

The NM sends a request to NFVO to terminate a VNF instance. In response the NFVO requests VNFM to terminate the VNF instance and the VIM to delete the compute (VMs), storage, and networking resources used by various VDUs of the VNF instance. The NFVO acknowledges the completion of the VNF termination to NM.

The NM requests EM to delete the <<IOC>> ServingGwFunction, assuming the VNF application is a Serving Gateway. The NM then sends a Disable VNF package to the NFVO. IN response, the NFVO marks the VNF package disabled at the CATALOG and sends an acknowledgement of VNF disable package to NM.

The NM sends a Delete VNF package to the NFVO. In response, the NFVO checks to determine whether the VNF package is used by any VNF instance. If the VNF package is in use, then the NFVO marks the VNF package in deletion pending at the CATALOG, and sends an acknowledgement to NM to indicate the VNF package is in deletion pending state. By contrast, if the VNF package is not in use then the NFVO executes "Delete VNF package" flow to remove the VNF package at CATALOG, and enables the VIM to delete the VNF software images(s) to NFVI. The NFVO acknowledges the deletion of VNF package and the NM requests EM to delete <<IOC>> ManagedElement.

Figure 7:
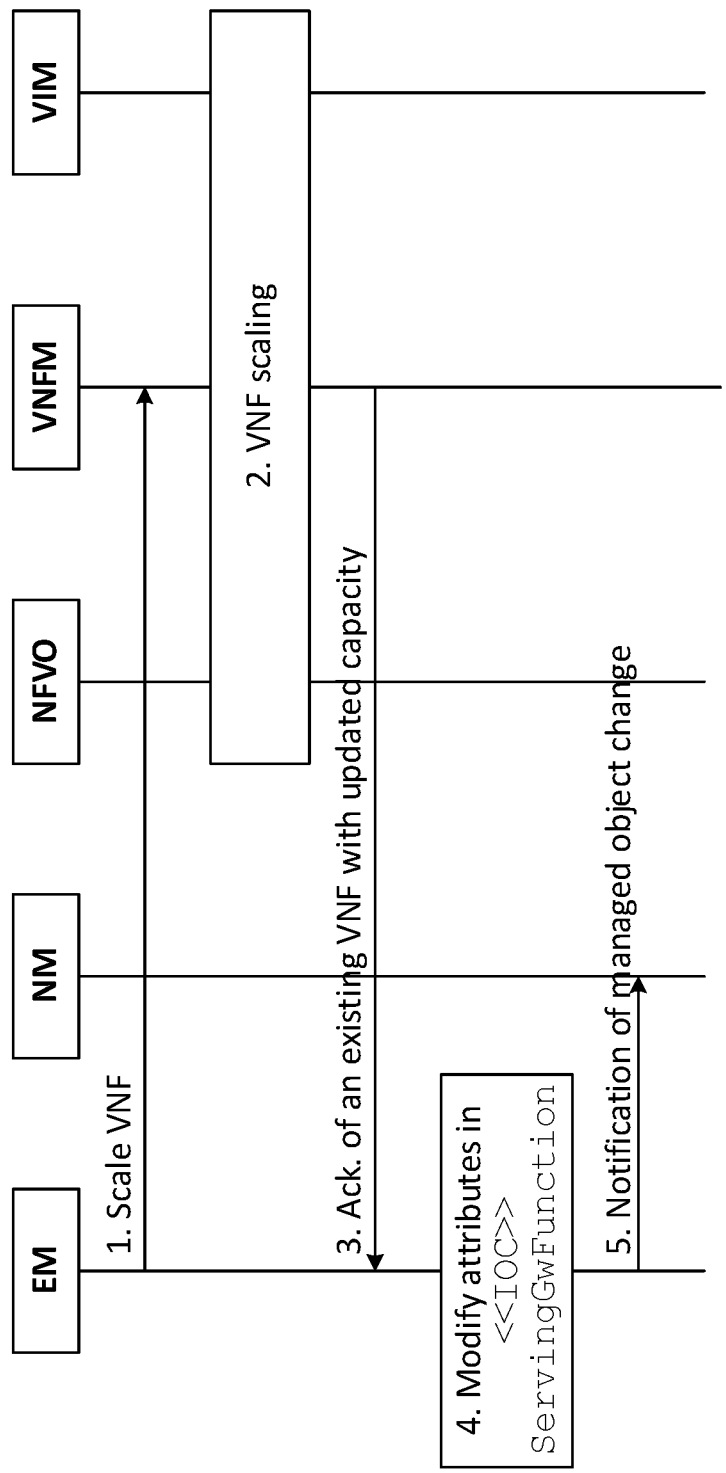
FIG. 7 is a diagram illustrating operations in a configuration management with VNF scaling procedures in accordance with various examples discussed herein.

FIG. 7 is a diagram illustrating operations in a configuration management with VNF scaling procedures in accordance with various examples discussed herein. FIG. 7 illustrates the procedure of configuration management functions to Modify the attributes of a Managed Object instance(s) involved during the VNF scaling.

Referring to FIG. 7, the EM send a request to the VNFM for VNF scaling. In response, the VNFM works with NFVO to enable VIM to create and start the VMs and the relevant networking resources as instructed by the scaling request. The VNFM notifies EM that an existing VNF has updated capacity. The EM modifies the <<IOC>> ServingGwFunction, assuming the VNF application is a Serving Gateway, to reflect the updated capacity in the VNF. Finally, the EM notifies NM about the managed object change.

Figure 8:
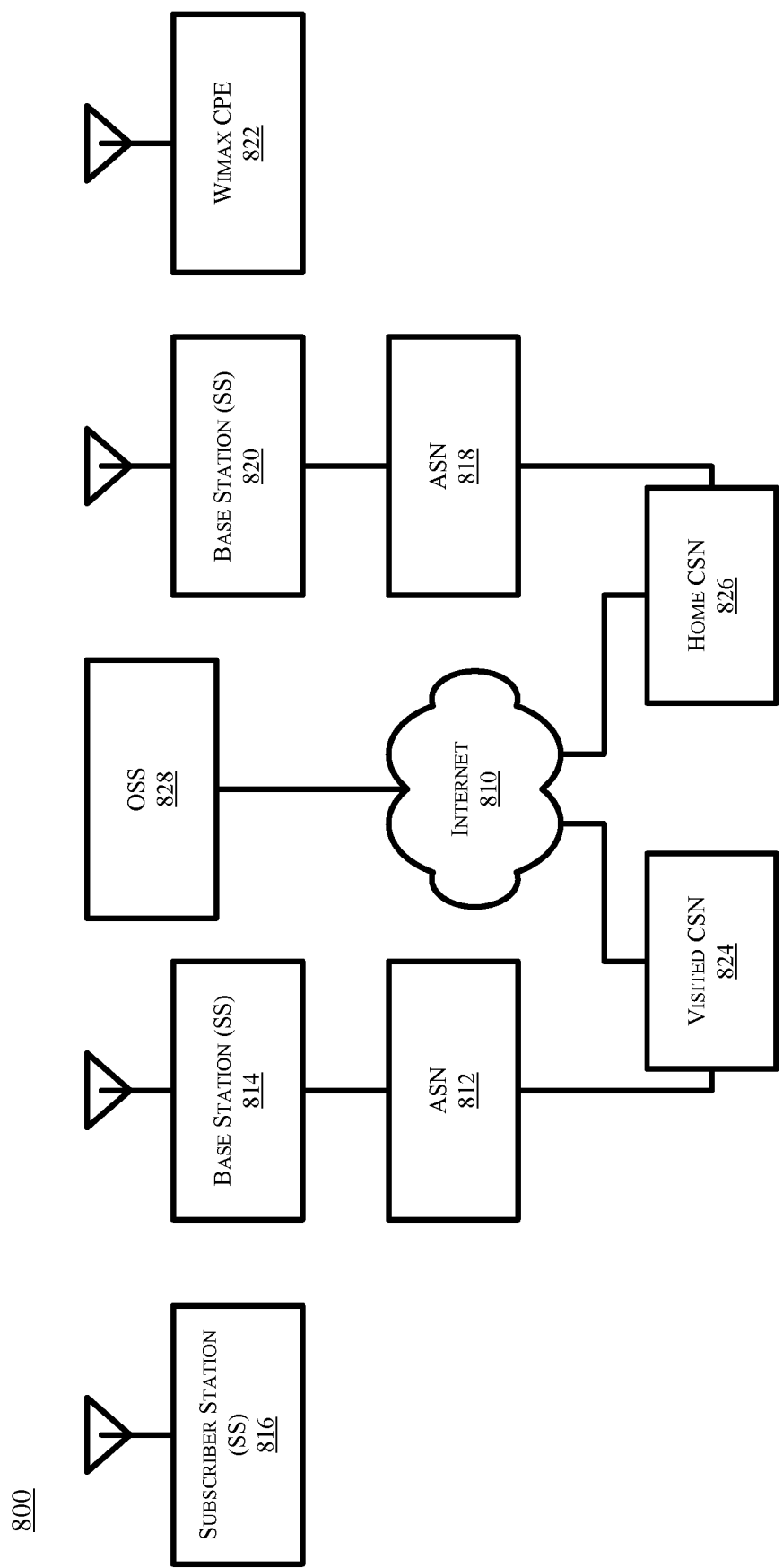
FIG. 8 is a schematic, block diagram illustration of a wireless network in accordance with one or more exemplary embodiments disclosed herein.

FIG. 8 is a schematic, block diagram illustration of a wireless network 800 in accordance with one or more exemplary embodiments disclosed herein. One or more of the elements of wireless network 800 may be capable of implementing methods to identify victims and aggressors according to the subject matter disclosed herein. As shown in FIG. 8, network 800 may be an Internet-Protocol-type (IP-type) network comprising an Internet-type network 810, or the like, that is capable of supporting mobile wireless access and/or fixed wireless access to Internet 810.

In one or more examples, network 800 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11 a/b/g/n standard), and so on. In one or more alternative examples, network 800 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 800 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 812 is capable of coupling with base station (BS) 814 to provide wireless communication between subscriber station (SS) 816 (also referred to herein as a wireless terminal) and Internet 810. In one example, subscriber station 816 may comprise a mobile-type device or information-handling system capable of wirelessly communicating via network 800, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein. ASN 812 may implement profiles that are capable of defining the mapping of network functions to one or more physical entities on network 800. Base station 814 may comprise radio equipment to provide radio-frequency (RF) communication with subscriber station 816, and may comprise, for example, the physical layer (PHY) and medium access control (MAC) layer equipment in compliance with an IEEE 802.16e-type standard. Base station 814 may further comprise an IP backplane to couple to Internet 810 via ASN 812, although the scope of the claimed subject matter is not limited in these respects.

Network 800 may further comprise a visited connectivity service network (CSN) 824 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 826, and the scope of the claimed subject matter is not limited in these respects.

Visited CSN 824 may be referred to as a visited CSN in the case, for example, in which visited CSN 824 is not part of the regular service provider of subscriber station 816, for example, in which subscriber station 816 is roaming away from its home CSN, such as home CSN 826, or, for example, in which network 800 is part of the regular service provider of subscriber station, but in which network 800 may be in another location or state that is not the main or home location of subscriber station 816.

In a fixed wireless arrangement, WiMAX-type customer premises equipment (CPE) 822 may be located in a home or business to provide home or business customer broadband access to Internet 810 via base station 820, ASN 818, and home CSN 826 in a manner similar to access by subscriber station 816 via base station 814, ASN 812, and visited CSN 824, a difference being that WiMAX CPE 822 is generally disposed in a stationary location, although it may be moved to different locations, whereas subscriber station may be utilized at one or more locations if subscriber station 816 is within range of base station 814 for example.

It should be noted that CPE 822 may not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 822 is capable of providing an uplink-transmit-power control technique that reduces interference experienced at other wireless devices according to the subject matter disclosed herein.

In accordance with one or more examples, operation support system (OSS) 828 may be part of network 800 to provide management functions for network 800 and to provide interfaces between functional entities of network 800. Network 800 of FIG. 8 is merely one type of wireless network showing a certain number of the components of network 800; however, the scope of the claimed subject matter is not limited in these respects.

Figure 9:
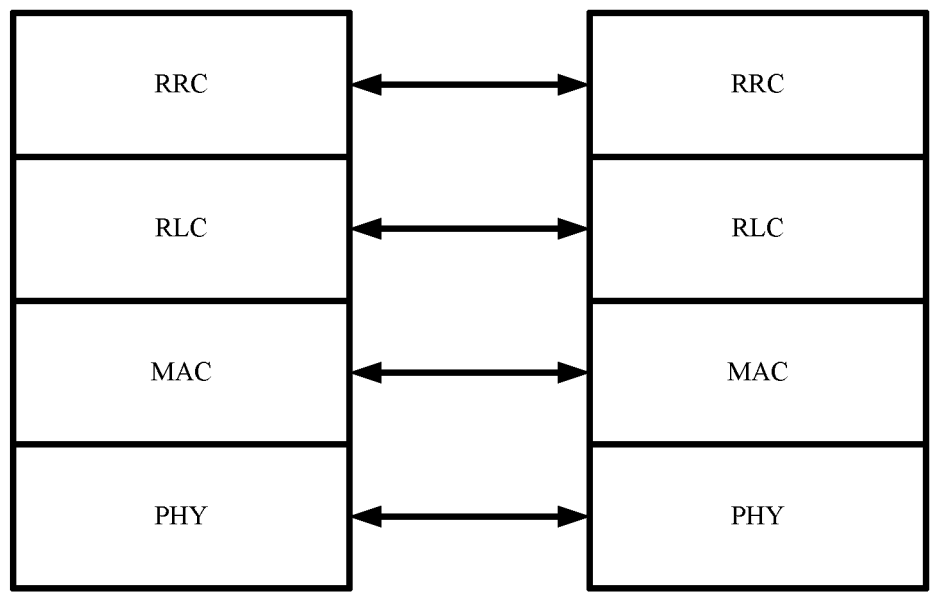
FIGS. 9 and 10 are schematic, block diagram illustrations, respectively, of radio interface protocol structures between a UE and an eNodeB based on a 3GPP-type radio access network standard in accordance with one or more exemplary embodiments disclosed herein.
Figure 10:
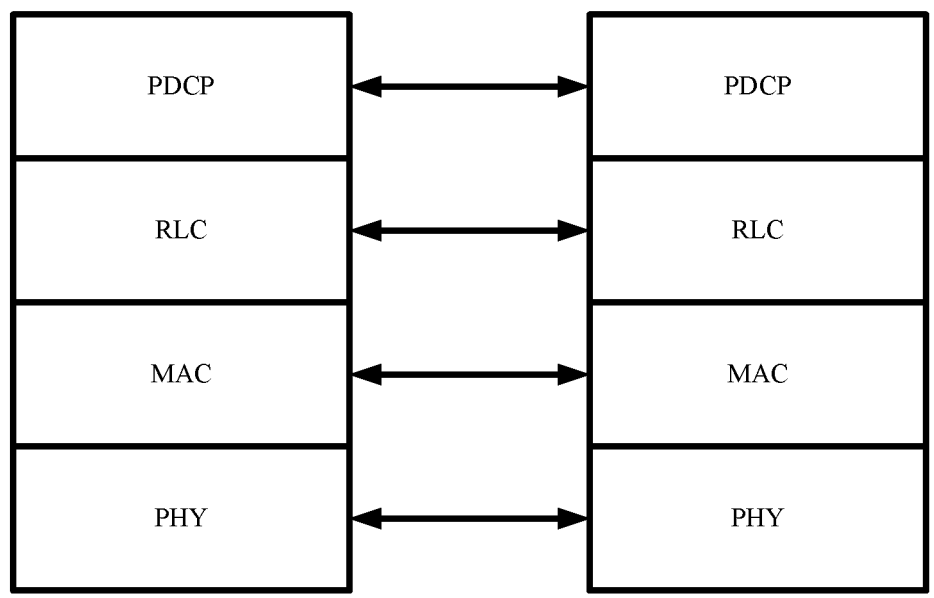

FIGS. 9 and 10 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 9 depicts individual layers of a radio protocol control plane and FIG. 10 depicts individual layers of a radio protocol user plane. The protocol layers of FIGS. 9 and 10 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 11:
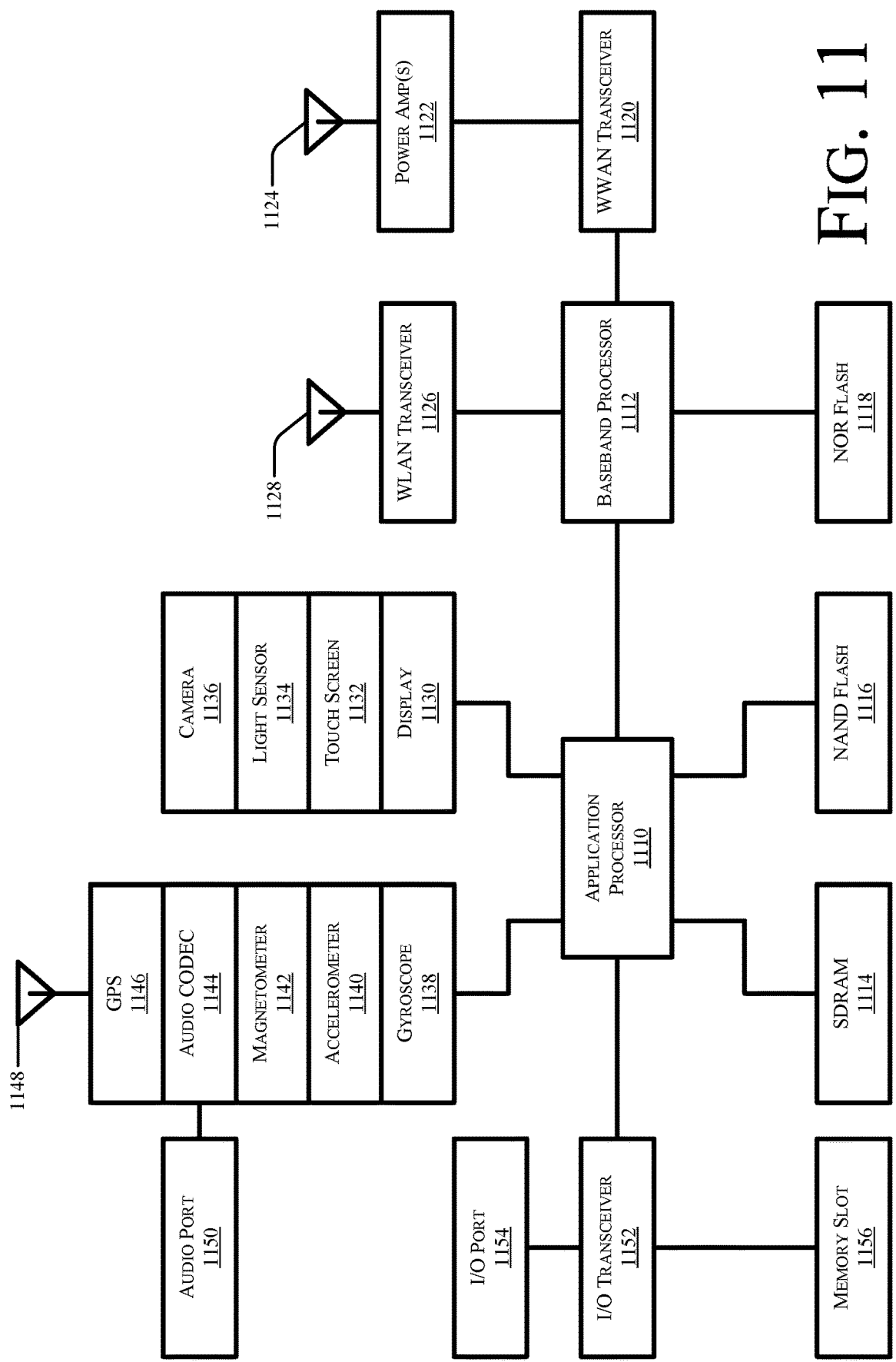
FIG. 11 is a schematic, block diagram illustration of an information-handling system in accordance with one or more exemplary embodiments disclosed herein.

FIG. 11 depicts an exemplary functional block diagram of an information-handling system 1100 that is capable of implementing techniques to create, modify, and delete managed objects utilized by VNF lifecycle management automatically according to the subject matter disclosed herein. Information handling system 1100 of FIG. 11 may tangibly embody one or more of any of the exemplary devices, exemplary network elements and/or functional entities of the network or network management elements as shown in and described herein. In one example, information-handling system 1100 may represent the components of a UE 111 or eNB 110, and/or a WLAN access point 120, or of the NFV-MANO 300 with greater or fewer components depending on the hardware specifications of the particular device or network element. In another example, the various memory components (e.g., SDRAM 1114, NAND flash 1116, and/or NOR flash 1118) may represent a machine-readable medium comprising logic instructions which, when executed by application processor 1110, cause the application processor to implement operations of the NFVO 310. Although information-handling system 1100 represents one example of several types of computing platforms, information-handling system 1100 may include more or fewer elements and/or different arrangements of elements than shown in FIG. 11, and the scope of the claimed subject matter is not limited in these respects.

In one or more examples, information-handling system 1100 may comprise one or more applications processor 1110 and a baseband processor 1112. Applications processor 1110 may be utilized as a general purpose processor to run applications and the various subsystems for information handling system 1100, and to capable of providing an uplink-transmit-power control technique that reduces interference experienced at other wireless devices according to the subject matter disclosed herein. Applications processor 1110 may include a single core or alternatively may include multiple processing cores wherein one or more of the cores may comprise a digital signal processor or digital signal processing core. Furthermore, applications processor 1110 may include a graphics processor or coprocessor disposed on the same chip, or alternatively a graphics processor coupled to applications processor 1110 may comprise a separate, discrete graphics chip. Applications processor 1110 may include on-board memory, such as cache memory, and further may be coupled to external memory devices such as synchronous dynamic random access memory (SDRAM) 1114 for storing and/or executing applications, such as capable of providing an uplink-transmit-power control technique that reduces interference experienced at other wireless devices according to the subject matter disclosed herein. During operation, and NAND flash 1116 for storing applications and/or data even when information handling system 1100 is powered off.

In one example, a list of candidate nodes may be stored in SDRAM 1114 and/or NAND flash 1116. Further, applications processor 1110 may execute computer-readable instructions stored in SDRAM 1114 and/or NAND flash 1116 that result in an uplink-transmit-power control technique that reduces interference experienced at other wireless devices according to the subject matter disclosed herein.

In one example, baseband processor 1112 may control the broadband radio functions for information-handling system 1100. Baseband processor 1112 may store code for controlling such broadband radio functions in a NOR flash 1118. Baseband processor 1112 controls a wireless wide area network (WWAN) transceiver 1120 which is used for modulating and/or demodulating broadband network signals, for example, for communicating via a 3GPP LTE network or the like as discussed herein with respect to FIG. 11. The WWAN transceiver 1120 couples to one or more power amplifiers 1122 that are respectively coupled to one or more antennas 1124 for sending and receiving radio-frequency signals via the WWAN broadband network. The baseband processor 1112 also may control a wireless local area network (WLAN) transceiver 1126 coupled to one or more suitable antennas 1128 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1110 and baseband processor 1112, and the scope of the claimed subject matter is not limited in these respects. For example, any one or more of SDRAM 1114, NAND flash 1116 and/or NOR flash 1118 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1110 may drive a display 1130 for displaying various information or data, and may further receive touch input from a user via a touch screen 1132, for example, via a finger or a stylus. In one exemplary embodiment, screen 1132 display a menu and/or options to a user that are selectable via a finger and/or a stylus for entering information into information-handling system 1100.

An ambient light sensor 1134 may be utilized to detect an amount of ambient light in which information-handling system 1100 is operating, for example, to control a brightness or contrast value for display 1130 as a function of the intensity of ambient light detected by ambient light sensor 1134. One or more cameras 1136 may be utilized to capture images that are processed by applications processor 1110 and/or at least temporarily stored in NAND flash 1116. Furthermore, applications processor may be coupled to a gyroscope 1138, accelerometer 1140, magnetometer 1142, audio coder/decoder (CODEC) 1144, and/or global positioning system (GPS) controller 1146 coupled to an appropriate GPS antenna 1148, for detection of various environmental properties including location, movement, and/or orientation of information-handling system 1100. Alternatively, controller 1146 may comprise a Global Navigation Satellite System (GNSS) controller. Audio CODEC 1144 may be coupled to one or more audio ports 1150 to provide microphone input and speaker outputs either via internal devices and/or via external devices coupled to information-handling system via the audio ports 1150, for example, via a headphone and microphone jack. In addition, applications processor 1110 may couple to one or more input/output (I/O) transceivers 1152 to couple to one or more I/O ports 1154 such as a universal serial bus (USB) port, a high-definition multimedia interface (HDMI) port, a serial port, and so on. Furthermore, one or more of the I/O transceivers 1152 may couple to one or more memory slots 1156 for optional removable memory, such as secure digital (SD) card or a subscriber identity module (SIM) card, although the scope of the claimed subject matter is not limited in these respects.

Figure 12:
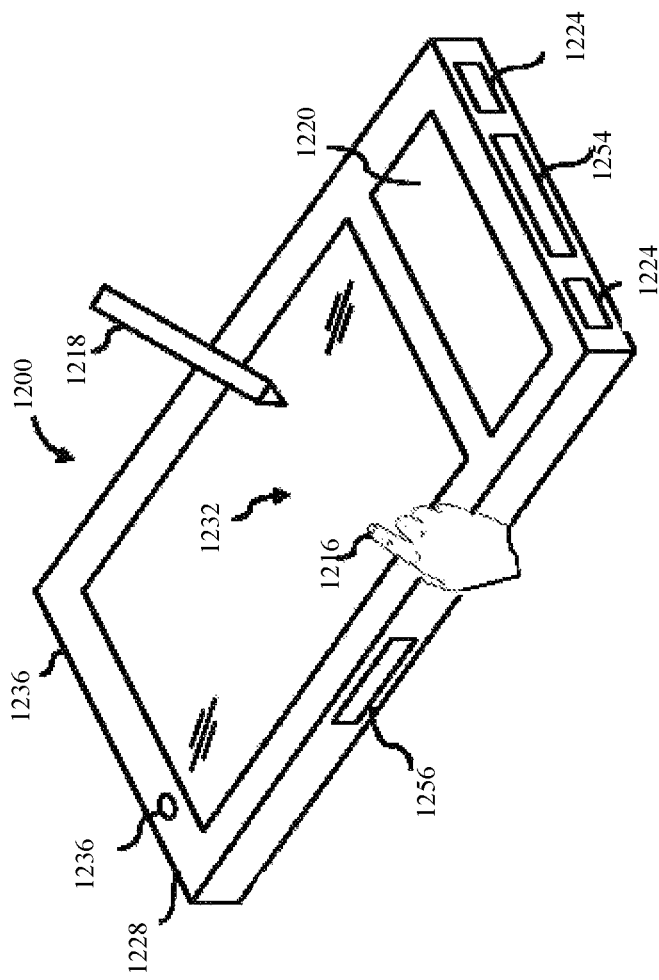
FIG. 12 is an isometric view of an exemplary embodiment of the information-handling system of FIG. 10 that optionally may include a touch screen in accordance with one or more embodiments disclosed herein.

FIG. 12 depicts an isometric view of an exemplary embodiment of the information-handling system of FIG. 11 that optionally may include a touch screen in accordance with one or more embodiments disclosed herein. FIG. 11 shows an example implementation of an information-handling system 1200 tangibly embodied as a cellular telephone, smartphone, smart-type device, or tablet-type device or the like, that is capable of implementing methods to identify victims and aggressors according to the subject matter disclosed herein. In one or more embodiments, the information-handling system a housing 1210 having a display 1030 that may include a touch screen 1032 for receiving tactile input control and commands via a finger 1216 of a user and/or a via stylus 1218 to control one or more applications processors 1110. The housing 1210 may house one or more components of information-handling system 1000, for example, one or more applications processors 1110, one or more of SDRAM 1114, NAND flash 1116, NOR flash 1118, baseband processor 1112, and/or WWAN transceiver 1120. The information-handling system 1200 further may optionally include a physical actuator area 1220 which may comprise a keyboard or buttons for controlling information-handling system 1000 via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1224 and a connection port 1254 for connecting the information-handling system 1200 to another electronic device, dock, display, battery charger, and so on. Additionally, information-handling system 1200 may include a headphone or speaker jack 1228 and one or more cameras 1236 on one or more sides of the housing 1210. It should be noted that the information-handling system 1200 of FIG. 12 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 13:
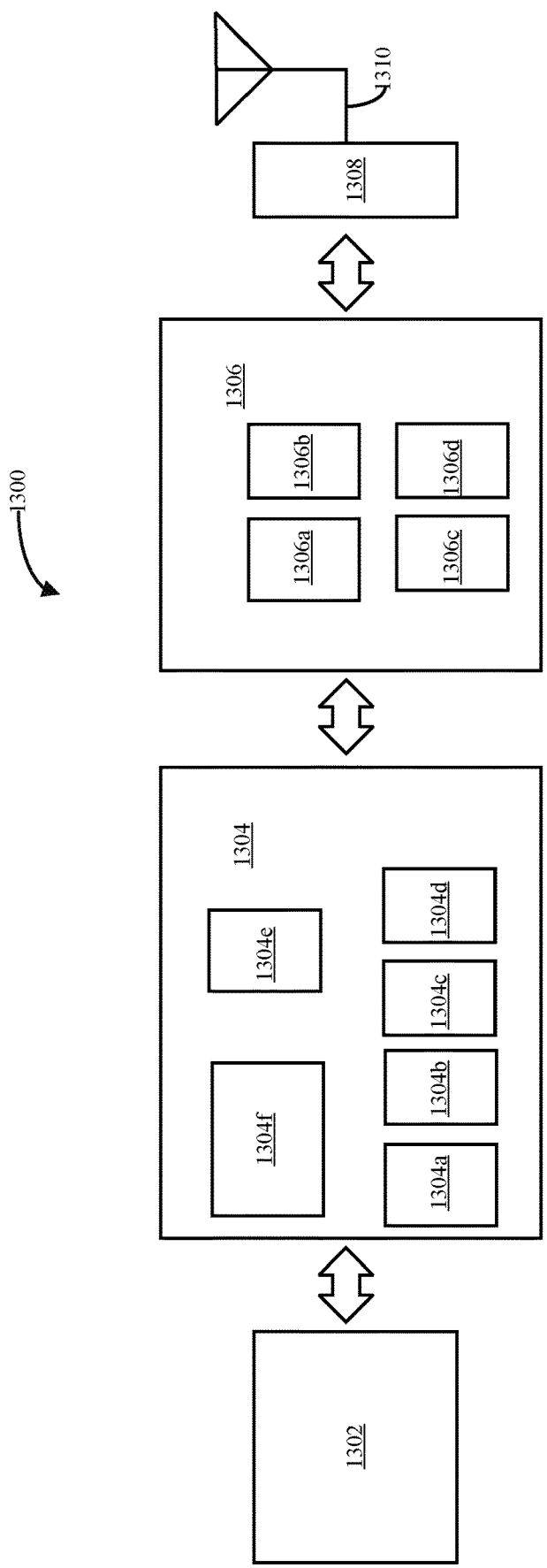
FIG. 13 is a schematic, block diagram illustration of components of a wireless device in accordance with one or more exemplary embodiments disclosed herein.

Embodiments described herein may be implemented into a system using any suitably configured hardware and/or software. FIG. 13 illustrates, for one embodiment, example components of a User Equipment (UE) device 1300. In some embodiments, the UE device 1300 may include application circuitry 1302, baseband circuitry 1304, Radio Frequency (RF) circuitry 1306, front-end module (FEM) circuitry 1308 and one or more antennas 1310, coupled together at least as shown.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304*a*, third generation (3G) baseband processor 1304*b*, fourth generation (4G) baseband processor 1304*c*, and/or other baseband processor(s) 1304*d* for other existing generations, generations in development or to be developed in the future (e.g., fifth generation (5G), 6G, etc.). The baseband circuitry 1304 (e.g., one or more of baseband processors 1304*a-d*) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (EUTRAN) protocol including, for example, physical (PHY), medium access control (MAC), radio link control (RLC), packet data convergence protocol (PDCP), and/or radio resource control (RRC) elements. A central processing unit (CPU) 1304e of the baseband circuitry 1304 may be configured to run elements of the protocol stack for signaling of the PHY, MAC, RLC, PDCP and/or RRC layers. In some embodiments, the baseband circuitry may include one or more audio digital signal processor(s) (DSP) 1304f. The audio DSP(s) 1304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306a, amplifier circuitry 1306b and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the embodiments is not limited in this respect.

In some embodiments, the mixer circuitry 1306a of the receive signal path and the mixer circuitry 1306a of the transmit signal path may include two or more mixers and may be arranged for quadrature downconversion and/or upconversion respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and/or direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306*d* of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310.

In some embodiments, the UE device 1300 may include additional elements such as, for example, memory/storage, display, camera, sensor, and/or input/output (I/O) interface.

The following pertains to further examples.

Example 1 is a network function virtualization orchestrator (NFVO) operable to facilitate network function virtualization (NFV) lifecycle management (LCM) operations, the NFVO comprising processing circuitry to receive a lifecycle management command (LCMC) from a network manager (NM) to initiate an LCM operation, in response to the LCMC, determine an LCM operation to be performed based at least in part on an LCM state table, determine an LCM state to which to transition after performance of the LCM operation, send a request to a virtualized infrastructure manager (VIM) to upload or delete one or more virtualized network function (VNF) software images to or from NFV infrastructure (NFVI) and create or delete one or more virtual machines (VMs) and relevant networking resources at NFVI, receive an acknowledgement from the VIM after successful allocation or deletion of one or more virtualized resources for a given VNF instance, and send an acknowledgement to the network manager (NM) after the LCM operation is complete, wherein the acknowledgment enables the NM to perform one or more configuration management (CM) operations.

In Example 2, the subject matter of Example 1 can optionally include an arrangement in which the LCMC comprises at least one of an on-board VNF package, a disable VNF package, an enable VNF package, an update VNF package, a query VNF package, a delete VNF package, a VNF instantiation, a VNF termination, or a VNF scaling.

In Example 3, the subject matter of any one of Examples 1-2 can optionally include an arrangement in which the LCM state comprises at least one of a VNF package disabled state, a VNF package enabled state, or a VNF package deletion pending state.

In Example 4, the subject matter of any one of Examples 1-3 can optionally include an arrangement wherein when no VNF package is on boarded yet, the processing circuitry configures the NFVO to receive an on-board VNF package command that contains the VNF software image(s) from NM, in response to the VNF package, to request VIM to upload the VNF software image(s) to NFVI, send an acknowledgement to NM after upload of the VNF software image(s) to NFVI, wherein the acknowledgment enables the NM to request an Element Manager (EM) to create a ManagedElement object, and change the LCM state to the VNF package disabled state.

In Example 5, the subject matter of any one of Examples 1-4 can optionally include an arrangement wherein when the LCM is in the VNF package disabled state, the processing circuitry configures the NFVO to receive an enable VNF package command from the NM, mark the VNF package enabled at a Catalog, send an acknowledgement to the NM to indicate the VNF package is enabled, and change the LCM state to the VNF package enabled state.

In Example 6, the subject matter of any one of Examples 1-5 can optionally include an arrangement wherein when the LCM is in the VNF package enabled state, the processing circuitry configures the NFVO to receive a VNF instantiation command from NM, request VIM to create and start virtual machines (VMs) and relevant networking resources at NFVI and send an acknowledgement to NM after successful instantiation of a VNF instance that is identified by a VNF instance ID, wherein the acknowledgement enables the NM to request an Element Manager (EM) to create a VNF object that is name-contained under the ManagedElement object, and initialize an attribute in the VNF object to the VNF instance ID.

In Example 7, the subject matter of any one of Examples 1-6 can optionally include an arrangement wherein when the LCM is in the VNF package enabled state, the processing circuitry configures the NFVO to receive a VNF termination command from the NM to terminate an existing VNF instance that is identified by the VNF instance ID, request the VIM to delete one or more virtual machines (VMs) and associated networking resources at the NFVI, and send an acknowledgement to the NM after successful VNF termination that will enable NM to request Element Manager (EM) to delete the VNF.

In Example 8, the subject matter of any one of Examples 1-7 can optionally include an arrangement wherein the LCM is in the VNF package enabled state, the processing circuitry configures the NFVO to receive disable VNF package command from NM, mark the VNF package disabled at the Catalog, send an acknowledgement to NM to indicate the VNF package is disabled and change the LCM state to VNF package disabled state.

In Example 9, the subject matter of any one of Examples 1-8 can optionally include an arrangement wherein wherein when the LCM is in the VNF package disabled state and the VNF package is not used by any VNF instance, the processing circuitry configures the NFVO to receive delete VNF package command from NM, remove the VNF package at a CATALOG, send a request to the VIM to delete the VNF software images(s) at NFVI, and send an acknowledgement to NM to after successful deletion of the VNF software images, wherein the request enables the NM to request the Element Manager (EM) to delete the ManagedElement object.

In Example 10, the subject matter of any one of Examples 1-9 can optionally include an arrangement wherein when the LCM is in VNF package disabled state and the VNF package is used by one or more VNF instances, the processing circuitry configures the NFVO to receive delete VNF package command from the NM, mark the VNF package in deletion pending at the CATALOG, send an acknowledgement to the NM to indicate the VNF package is in deletion pending, and change the LCM state to VNF package deletion pending state.

In Example 11, the subject matter of any one of Examples 1-10 can optionally include an arrangement wherein when the LCM is in the VNF package disabled state and the VNF package is used by one or more VNF instance(s), the processing circuitry configures the NFVO to receive a VNF termination command from the NM, request the VIM to delete one or more virtual machines (VMs) and associated networking resources at the NFVI, and send an acknowledgement to NM after successful VNF termination that will enable NM to request Element Manager (EM) to delete the VNF.

In Example 12, the subject matter of any one of Examples 1-11 can optionally include wherein when the LCM is in the VNF package deletion pending state, and the VNF package is used by two or more VNF instance(s), the processing circuitry configures the NFVO to receive a VNF termination command from the NM, request the VIM to delete one or more virtual machines (VMs) and associated networking resources at the NFVI, and send an acknowledgement to NM after successful VNF termination that will enable NM to request Element Manager (EM) to delete the VNF.

In Example 13, the subject matter of any one of Examples 1-12 can optionally include an arrangement wherein the LCM is in VNF package deletion pending state, and the VNF package is used by one VNF instance, the processing circuitry configures the NFVO to receive a VNF termination command to terminate the VNF instance using the VNF package from the NM, remove the VNF package at CATALOG, request VIM to delete virtual machines (VMs), relevant networking resources, and the VNF software images(s) at NFVI, and send an acknowledgement to the NM after successful VNF termination and VNF package deletion that will enable NM to request Element Manager (EM) to delete the VNF and the ManagedElement object.

Example 14 is a virtualized network function manager (VNFM) to facilitate network function virtualization (NFV) lifecycle management (LCM) operations, the VNFM comprising processing circuitry to receive a request to scale a given VNF instance from a element manager (EM), send a request to VIM to create and start the VMs and the relevant networking resources as instructed by the scaling request, receive an acknowledgement from the VIM after successful scaling of the virtualized resources for a given VNF instance, and send an acknowledgement to EM after VNF scaling operation is done that will enable EM to modify an object of the VNF and to notify NM for the change of managed object.

In Example 15, the subject matter of Example 14 can optionally include an arrangement wherein the object of the VNF comprises at least one of a PCRFunction object, a ServingGwFunction object, or a PGWFunction object.

Example 16 is a machine-readable medium comprising instructions which, when executed by a processor in a network function virtualization orchestrator (NFVO) operable to facilitate network function virtualization (NFV) lifecycle management (LCM) operations, configure the processor to receive a lifecycle management command (LCMC) from a network manager (NM) to initiate an LCM operation, in response to the LCMC, determine an LCM operation to be performed based at least in part on an LCM state table, determine an LCM state to which to transition after performance of the LCM operation, send a request to a virtualized infrastructure manager (VIM) to upload or delete one or more virtualized network function (VNF) software images to or from NFV infrastructure (NFVI), and create or delete one or more virtual machines (VMs) and relevant networking resources at NFVI, receive an acknowledgement from the VIM after successful allocation or deletion of one or more virtualized resources for a given VNF instance and send an acknowledgement to the network manager (NM) after the LCM operation is complete, wherein the acknowledgment enables the NM to perform one or more configuration management (CM) operations.

In Example 17, the subject matter of Example 1 can optionally include an arrangement in which the LCMC comprises at least one of an on-board VNF package, a disable VNF package, an enable VNF package, an update VNF package, a query VNF package, a delete VNF package, a VNF instantiation, a VNF termination, or a VNF scaling.

In Example 18, the subject matter of any one of Examples 16-17 can optionally include an arrangement in which the LCM state comprises at least one of a VNF package disabled state, a VNF package enabled state, or a VNF package deletion pending state.

In Example 19, the subject matter of any one of Examples 16-18 can optionally include an arrangement wherein when no VNF package is on boarded yet, the processing circuitry configures the NFVO to receive an on-board VNF package command that contains the VNF software image(s) from NM, in response to the VNF package, to request VIM to upload the VNF software image(s) to NFVI, send an acknowledgement to NM after upload of the VNF software image(s) to NFVI, wherein the acknowledgment enables the NM to request an Element Manager (EM) to create a ManagedElement object, and change the LCM state to the VNF package disabled state.

In Example 20, the subject matter of any one of Examples 16-19 can optionally include an arrangement wherein when the LCM is in the VNF package disabled state, the processing circuitry configures the NFVO to receive an enable VNF package command from the NM, mark the VNF package enabled at a Catalog, send an acknowledgement to the NM to indicate the VNF package is enabled, and change the LCM state to the VNF package enabled state.

In Example 21, the subject matter of any one of Examples 16-20 can optionally include an arrangement wherein when the LCM is in the VNF package enabled state, the processing circuitry configures the NFVO to receive a VNF instantiation command from NM, request VIM to create and start virtual machines (VMs) and relevant networking resources at NFVI and send an acknowledgement to NM after successful instantiation of a VNF instance that is identified by a VNF instance ID, wherein the acknowledgement enables the NM to request an Element Manager (EM) to create a VNF object that is name-contained under the ManagedElement object, and initialize an attribute in the VNF object to the VNF instance ID.

In Example 22, the subject matter of any one of Examples 16-21 can optionally include an arrangement wherein when the LCM is in the VNF package enabled state, the processing circuitry configures the NFVO to receive a VNF termination command from the NM to terminate an existing VNF instance that is identified by the VNF instance ID, request the VIM to delete one or more virtual machines (VMs) and associated networking resources at the NFVI, and send an acknowledgement to the NM after successful VNF termination that will enable NM to request Element Manager (EM) to delete the VNF.

In Example 23, the subject matter of any one of Examples 16-22 can optionally include an arrangement wherein the LCM is in the VNF package enabled state, the processing circuitry configures the NFVO to receive disable VNF package command from NM, mark the VNF package disabled at the Catalog, send an acknowledgement to NM to indicate the VNF package is disabled and change the LCM state to VNF package disabled state.

In Example 24, the subject matter of any one of Examples 16-23 can optionally include an arrangement wherein wherein when the LCM is in the VNF package disabled state and the VNF package is not used by any VNF instance, the processing circuitry configures the NFVO to receive delete VNF package command from NM, remove the VNF package at a CATALOG, send a request to the VIM to delete the VNF software images(s) at NFVI, and send an acknowledgement to NM to after successful deletion of the VNF software images, wherein the request enables the NM to request the Element Manager (EM) to delete the ManagedElement object.

In Example 25, the subject matter of any one of Examples 16-24 can optionally include an arrangement wherein when the LCM is in VNF package disabled state and the VNF package is used by one or more VNF instances, the processing circuitry configures the NFVO to receive delete VNF package command from the NM, mark the VNF package in deletion pending at the CATALOG, send an acknowledgement to the NM to indicate the VNF package is in deletion pending, and change the LCM state to VNF package deletion pending state.

In Example 26, the subject matter of any one of Examples 16-25 can optionally include an arrangement wherein when the LCM is in the VNF package disabled state and the VNF package is used by one or more VNF instance(s), the processing circuitry configures the NFVO to receive a VNF termination command from the NM, request the VIM to delete one or more virtual machines (VMs) and associated networking resources at the NFVI, and send an acknowledgement to NM after successful VNF termination that will enable NM to request Element Manager (EM) to delete the VNF.

In Example 27, the subject matter of any one of Examples 16-26 can optionally include wherein when the LCM is in the VNF package deletion pending state, and the VNF package is used by two or more VNF instance(s), the processing circuitry configures the NFVO to receive a VNF termination command from the NM, request the VIM to delete one or more virtual machines (VMs) and associated networking resources at the NFVI, and send an acknowledgement to NM after successful VNF termination that will enable NM to request Element Manager (EM) to delete the VNF.

In Example 28, the subject matter of any one of Examples 16-27 can optionally include an arrangement wherein the LCM is in VNF package deletion pending state, and the VNF package is used by one VNF instance, the processing circuitry configures the NFVO to receive a VNF termination command to terminate the VNF instance using the VNF package from the NM, remove the VNF package at CATALOG, request VIM to delete virtual machines (VMs), relevant networking resources, and the VNF software images(s) at NFVI, and send an acknowledgement to the NM after successful VNF termination and VNF package deletion that will enable NM to request Element Manager (EM) to delete the VNF and the ManagedElement object.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A network function virtualization orchestrator (NFVO) operable to facilitate network function virtualization (NFV) lifecycle management (LCM) operations, the NFVO comprising processing circuitry to:
   maintain a network service (NS) catalog, a virtualized network function (VNF) catalog, one or more network function virtualization (NFV) instances, and one or more network function virtualization infrastructure (NFVI) instances;
   receive a lifecycle management command (LCMC) from a network manager (NM) to initiate an LCM operation;

in response to the LCMC, determine an LCM operation to be performed based at least in part on an LCM state table;
determine an LCM state to which to transition after performance of the LCM operation;
send a request to a virtualized infrastructure manager (VIM) to:
upload or delete one or more virtualized network function (VNF) software images to or from NFV infrastructure (NFVI);
update the network service (NS) catalog to reflect an addition or deletion of the one or more virtualized network function (VNF) software images; and
create or delete one or more virtual machines (VMs) and relevant networking resources at NFVI;
receive an acknowledgement from the VIM after successful allocation or deletion of one or more virtualized resources for a given VNF instance; and
send an acknowledgement to the network manager (NM) after the LCM operation is complete, wherein the acknowledgment enables the NM to perform one or more configuration management (CM) operations.

2. The NFVO of claim 1, wherein the LCMC comprises at least one of an on-board VNF package, a disable VNF package, an enable VNF package, an update VNF package, a query VNF package, a delete VNF package, a VNF instantiation, a VNF termination, or a VNF scaling.

3. The NFVO of claim 1, wherein the LCM state comprises at least one of a VNF package disabled state, aVNF package enabled state, or a VNF package deletion pending state.

4. The NFVO of claim 3, wherein when no VNF package is on boarded yet, the processing circuitry configures the NFVO to:
receive an on-board VNF package command that contains the VNF software image(s) from NM;
in response to the VNF package, to request VIM to upload the VNF software image(s) to NFVI;
send an acknowledgement to NM after upload of the VNF software image(s) to NFVI, wherein the acknowledgment enables the NM to request an Element Manager (EM) to create a ManagedElement object; and
change the LCM state to the VNF package disabled state.

5. The NFVO of claim 4, wherein when the LCM is in the VNF package disabled state, the processing circuitry configures the NFVO to:
receive an enable VNF package command from the NM;
mark the VNF package enabled at a Catalog;
send an acknowledgement to the NM to indicate the VNF package is enabled; and
change the LCM state to the VNF package enabled state.

6. The NFVO of claim 4, wherein when the LCM is in the VNF package enabled state, the processing circuitry configures the NFVO to:
receive a VNF instantiation command from NM;
request VIM to create and start virtual machines (VMs) and relevant networking resources at NFVI; and
send an acknowledgement to NM after successful instantiation of a VNF instance that is identified by a VNF instance ID, wherein the acknowledgement enables the NM to request an Element Manager (EM) to create a VNF object that is name-contained under the ManagedElement object, and initialize an attribute in the VNF object to the VNF instance ID.

7. The NFVO of claim 3, wherein when the LCM is in the VNF package enabled state, the processing circuitry configures the NFVO to:
receive a VNF termination command from the NM to terminate an existing VNF instance that is identified by the VNF instance ID;
request the VIM to delete one or more virtual machines (VMs) and associated networking resources at the NFVI; and
send an acknowledgement to the NM after successful VNF termination that will enable NM to request Element Manager (EM) to delete the VNF.

8. The NFVO of claim 3, wherein the LCM is in the VNF package enabled state, the processing circuitry configures the NFVO to:
receive disable VNF package command from NM;
mark the VNF package disabled at the Catalog;
send an acknowledgement to NM to indicate the VNF package is disabled; and
change the LCM state to VNF package disabled state.

9. The NFVO of claim 3, wherein when the LCM is in the VNF package disabled state and the VNF package is not used by any VNF instance, the processing circuitry configures the NFVO to:
receive delete VNF package command from NM;
remove the VNF package at a CATALOG;
send a request to the VIM to delete the VNF software images(s) at NFVI; and
send an acknowledgement to NM to after successful deletion of the VNF software images, wherein the request enables the NM to request the Element Manager (EM) to delete the ManagedElement object.

10. The NFVO of claim 3, wherein when the LCM is in VNF package disabled state and the VNF package is used by one or more VNF instances, the processing circuitry configures the NFVO to:
receive delete VNF package command from the NM;
mark the VNF package in deletion pending at the CATALOG;
send an acknowledgement to the NM to indicate the VNF package is in deletion pending; and
change the LCM state to VNF package deletion pending state.

11. The NFVO of claim 3, wherein when the LCM is in the VNF package disabled state and the VNF package is used by one or more VNF instance(s), the processing circuitry configures the NFVO to:
receive a VNF termination command from the NM;
request the VIM to delete one or more virtual machines (VMs) and associated networking resources at the NFVI; and
send an acknowledgement to NM after successful VNF termination that will enable NM to request Element Manager (EM) to delete the VNF.

12. The NFVO of claim 3, wherein when the LCM is in the VNF package deletion pending state, and the VNF package is used by two or more VNF instance(s), the processing circuitry configures the NFVO to:
receive a VNF termination command from the NM;
request the VIM to delete one or more virtual machines (VMs) and associated networking resources at the NFVI; and
send an acknowledgement to NM after successful VNF termination that will enable NM to request Element Manager (EM) to delete the VNF.

13. The NFVO of claim 1, wherein the LCM is in VNF package deletion pending state, and the VNF package is used by one VNF instance, the processing circuitry configures the NFVO to:

receive a VNF termination command to terminate the VNF instance using the VNF package from the NM;

remove the VNF package at CATALOG, request VIM to delete virtual machines (VMs), relevant networking resources, and the VNF software images(s) at NFVI; and send an acknowledgement to the NM after successful VNF termination and VNF package deletion that will enable NM to request Element Manager (EM) to delete the VNF and the ManagedElement object.

14. A virtualized network function manager (VNFM) to facilitate network function virtualization (NFV) lifecycle management (LCM) operations, the VNFM comprising processing circuitry to:

receive a request to scale a given VNF instance from a element manager (EM);

send a request to VIM to create and start the VMs and the relevant networking resources as instructed by the scaling request;

receive an acknowledgement from the VIM after successful scaling of the virtualized resources for a given VNF instance; and send an acknowledgement to EM after VNF scaling operation is done that will enable EM to modify an object of the VNF and to notify NM for the change of managed object.

15. The NFVO of claim 14, wherein the object of the VNF comprises at least one of a PCRFunction object, a Serving-GwFunction object, or a PGWFunction object.

16. A non-transitory machine-readable medium comprising instructions which, when executed by a processor in a network function virtualization orchestrator (NFVO) operable to facilitate network function virtualization (NFV) lifecycle management (LCM) operations, configure the processor to:

maintain a network service (NS) catalog, a virtualized network function (VNF) catalog, one or more network function virtualization (NFV) instances, and one or more network function virtualization infrastructure (NFVI) instances;

receive a lifecycle management command (LCMC) from a network manager (NM) to initiate an LCM operation;

in response to the LCMC, determine an LCM operation to be performed based at least in part on an LCM state table;

determine an LCM state to which to transition after performance of the LCM operation;

send a request to a virtualized infrastructure manager (VIM) to:

upload or delete one or more virtualized network function (VNF) software images to or from NFV infrastructure (NFVI);

update the network service (NS) catalog to reflect an addition or deletion of the one or more virtualized network function (VNF) software images; and create or delete one or more virtual machines (VMs) and relevant networking resources at NFVI;

receive an acknowledgement from the VIM after successful allocation or deletion of one or more virtualized resources for a given VNF instance; and send an acknowledgement to the network manager (NM) after the LCM operation is complete, wherein the acknowledgment enables the NM to perform one or more configuration management (CM) operations.

17. The non-transitory machine-readable medium of claim 16, wherein the LCMC comprises at least one of an on-board VNF package, a disable VNF package, an enable VNF package, an update VNF package, a query VNF package, a delete VNF package, a VNF instantiation, a VNF termination, or a VNF scaling.

18. The non-transitory machine-readable medium of claim 16, wherein the LCM state comprises at least one of a VNF package disabled state, aVNF package enabled state, or a VNF package deletion pending state.

19. The non-transitory machine-readable medium of claim 18, further comprising instructions which, when executed by a processor, configure the processor to:

receive an on-board VNF package command that contains the VNF software image(s) from NM;

in response to the VNF package, to request VIM to upload the VNF software image(s) to NFVI;

send an acknowledgement to NM after upload of the VNF software image(s) to NFVI, wherein the acknowledgment enables the NM to request an Element Manager (EM) to create a ManagedElement object; and change the LCM state to the VNF package disabled state.

20. The non-transitory machine-readable medium of claim 19, further comprising instructions which, when the LCM is in the VNF package disabled state, configure the processor to:

receive an enable VNF package command from the NM;

mark the VNF package enabled at a Catalog;

send an acknowledgement to the NM to indicate the VNF package is enabled; and change the LCM state to the VNF package enabled state.

21. The non-transitory machine-readable medium of claim 19, further comprising instructions which, when the LCM is in the VNF package enabled state, configure the processor to:

receive a VNF instantiation command from NM;

request VIM to create and start virtual machines (VMs) and relevant networking resources at NFVI; and send an acknowledgement to NM after successful VNF instantiation, wherein the acknowledgement enables the NM to request an Element Manager (EM) to create a VNF object that is name-contained under the ManagedElement object.

22. The non-transitory machine-readable medium of claim 18, further comprising instructions which, when the LCM is in the VNF package enabled state, configure the processor to:

receive a VNF termination command from the NM to terminate an existing VNF instance;

request the VIM to delete one or more virtual machines (VMs) and associated networking resources at the NFVI; and send an acknowledgement to the NM after successful VNF termination that will enable NM to request Element Manager (EM) to delete the VNF.

23. The non-transitory machine-readable medium of claim 18, further comprising instructions which, when the LCM is in the VNF package enabled state, configure the processor to:

receive disable VNF package command from NM;

mark the VNF package disabled at the Catalog;

send an acknowledgement to NM to indicate the VNF package is disabled; and change the LCM state to VNF package disabled state.

24. The non-transitory machine-readable medium of claim 18, further comprising instructions which, when the LCM is in the VNF package disabled state and the VNF package is not used by any VNF instance, configure the NFVO to:

receive delete VNF package command from NM;
remove the VNF package at a CATALOG;
send a request to the VIM to delete the VNF software images(s) at NFVI; and
send an acknowledgement to NM to after successful deletion of the VNF software images, wherein the request enables the NM to request the Element Manager (EM) to delete the ManagedElement object.

25. The non-transitory machine-readable medium of claim 18, further comprising instructions which, when the LCM is in VNF package disabled state and the VNF package is used by one or more VNF instances, configure the NFVO to:
receive delete VNF package command from the NM;
mark the VNF package in deletion pending at the CATALOG;
send an acknowledgement to the NM to indicate the VNF package is in deletion pending; and
change the LCM state to VNF package deletion pending state.

* * * * *